US012646274B2

(12) United States Patent
Kurz

(10) Patent No.: US 12,646,274 B2
(45) Date of Patent: Jun. 2, 2026

(54) MULTIPLE DEVICE MODEL AUGMENTATION

(71) Applicant: Apple Inc., Cupertino, CA (US)

(72) Inventor: Daniel Kurz, Hilo, HI (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 18/441,274

(22) Filed: Feb. 14, 2024

(65) Prior Publication Data

US 2024/0312167 A1 Sep. 19, 2024

Related U.S. Application Data

(60) Provisional application No. 63/452,535, filed on Mar. 16, 2023.

(51) Int. Cl.
| | |
|---|---|
| *G06T 19/20* | (2011.01) |
| *G06V 10/74* | (2022.01) |
| *G06V 10/774* | (2022.01) |
| *G06V 40/10* | (2022.01) |

(52) U.S. Cl.
CPC ............ *G06T 19/20* (2013.01); *G06V 10/761* (2022.01); *G06V 10/774* (2022.01); *G06V 40/10* (2022.01)

(58) Field of Classification Search
CPC ....... G06T 17/00; G06T 19/20; G06T 19/006; G06V 10/761; G06V 10/774; G06V 40/10; G06F 3/011
See application file for complete search history.

(56) References Cited

U.S. PATENT DOCUMENTS

| | | | |
|---|---|---|---|
| 9,240,069 B1 * | 1/2016 | Li | ........................ G02B 27/017 |
| 10,813,559 B2 | 10/2020 | Frank et al. | |
| 10,916,044 B2 | 2/2021 | Imoto et al. | |
| 2017/0019595 A1 * | 1/2017 | Chen | ....................... G06T 3/047 |
| 2019/0339416 A1 * | 11/2019 | Elkabetz | ................. G01W 1/02 |
| 2021/0149190 A1 * | 5/2021 | Johnson | ............... H04N 13/344 |
| 2021/0385890 A1 | 12/2021 | Jiang et al. | |
| 2023/0388404 A1 * | 11/2023 | Meen | ................ H04M 1/72427 |

* cited by examiner

*Primary Examiner* — Sing-Wai Wu
(74) *Attorney, Agent, or Firm* — Thompson Hine LLP

(57) ABSTRACT

Various implementations disclosed herein include devices, systems, and methods that use external device data to improve user data on a wearable device. For example, an example process may include receiving first sensor data, from a sensor of a wearable electronic device, depicting a user of the wearable electronic device. The process may further include receiving second sensor data depicting the user from a second device separate from the wearable electronic device. At least a part of the user depicted in the second sensor data is absent in the first sensor data. The process may further include determining that a portion of the second sensor data depicts the user based on a similarity between the first sensor data and second sensor data. The process may further include updating a user model based on the second sensor data.

25 Claims, 6 Drawing Sheets

300

400

Electronic Device(s)
410

Network
402

Information System Server
420

User Model
Database
415

Location
Instruction Set
416

Communication
Session
Instruction Set
414

User
Identification
Instruction Set
412

Model Update
Instruction Set
422

Model Upload
Instruction Set
424

Model
Presentation
Instruction Set
426

500

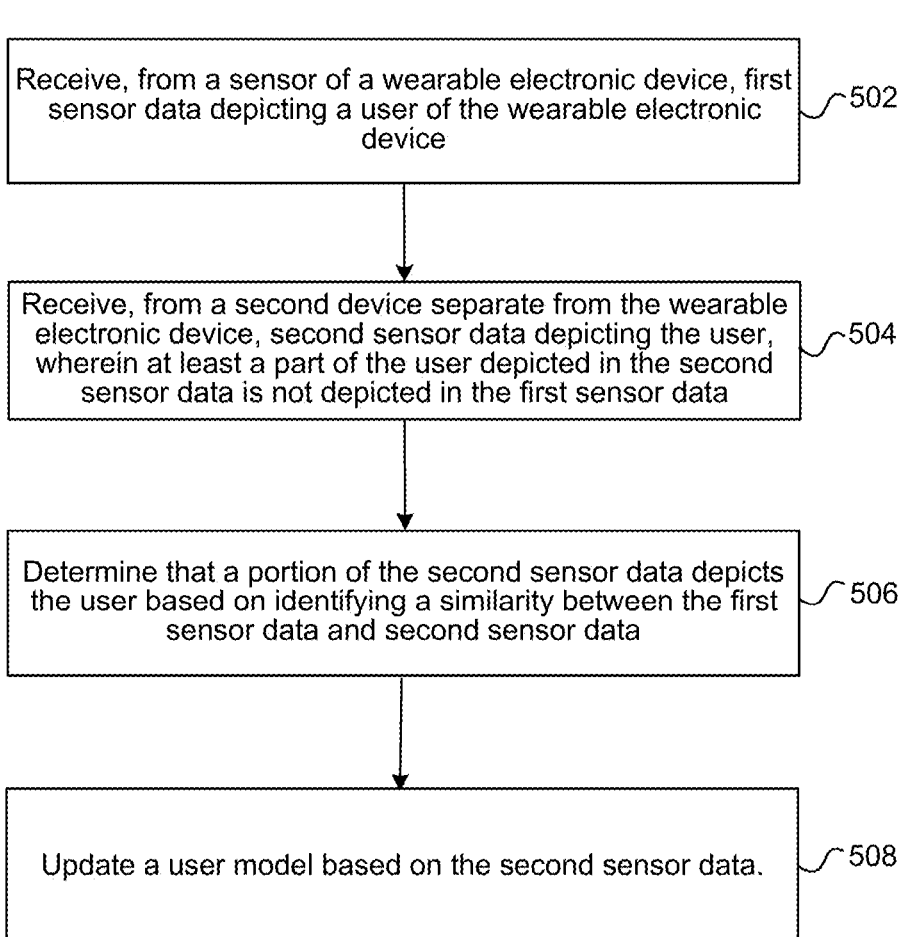

Receive, from a sensor of a wearable electronic device, first sensor data depicting a user of the wearable electronic device ⟋502

Receive, from a second device separate from the wearable electronic device, second sensor data depicting the user, wherein at least a part of the user depicted in the second sensor data is not depicted in the first sensor data ⟋504

Determine that a portion of the second sensor data depicts the user based on identifying a similarity between the first sensor data and second sensor data ⟋506

Update a user model based on the second sensor data. ⟋508

FIG. 5

Device 600

MULTIPLE DEVICE MODEL AUGMENTATION

CROSS-REFERENCE TO RELATED APPLICATIONS

This application claims the benefit of U.S. Provisional Application Ser. No. 63/452,535 filed Mar. 16, 2023, which is incorporated herein in its entirety.

TECHNICAL FIELD

The present disclosure generally relates to systems, methods, and devices that enable external device sensor data to augment wearable device sensor data to update a model.

BACKGROUND

It may be desirable to generate or modify a representation of a user, such as a 3D user model, while a user is using a device, such as a head mounted device (HMD). However, existing systems may not utilize data that is potentially available from external sources to generate or modify such a representation.

SUMMARY

Various implementations disclosed herein include systems, methods, and devices that use data from an external device (e.g., a camera separate from a watch, head-worn speaker device, HMD, or other device worn by a user) to improve user data (e.g., a 3D user model) generated on a wearable device. Data provided by an external device may include visual data related to body portions of a user (e.g., a torso, back, leg portion, foot, etc.) and/or information associated with features of the user (such as, inter alia, body dimensions, body shape, skin texture, clothing texture/material, user pose, etc.) that may not be visible or otherwise captured via sensors (e.g., cameras) of a device being worn by the user. For example, an HMD's sensors may only provide a view of a limited portion of a user (wearing the HMD) from a limited perspective to supply data for generating a body model of the user while an external device may provide a differing perspective view that may include one or more different portions of the user. A dataset (associated with an external device's view of the user) obtained via the external device may be transmitted to the HMD such that a 3D model of the user may be more accurately, completely, efficiently, or otherwise more desirably generated or updated.

In some implementations, the data from the external device corresponds to the same time period, e.g., current external device data is used to supplement current wearable device data. In other implementations, the data from the external device corresponds to a different time period, e.g., previously-captured external device data is used to supplement current wearable device data. For example, stored sensor data (e.g., previously retrieved images of the user from a device such as a security camera) may be additionally used to update the body model of the user.

In some implementations the data from the different devices that is used to generate or update a model is matched (e.g., identified as corresponding to the same person/user) based on matching processes or criteria. In some implementations, the user may be identified in data from an external device (for data matching or other purposes) based on determining a similarity between data retrieved from the external device and data retrieved from the HMD. In some implementations, the user may be identified via similar feature points identified in images or other sensor data of the user, matching clothes recognized via images or other sensor data, facial similarities recognized within images or other sensor data of the user, body part similarities recognized in images or other sensor data, etc. In some implementations, the user may be identified based on determining that the external device and the HMD are both connected to a same network and/or are both associated with a same user account. In some implementations, the user may be identified by determining that the user is the only person in a room or other environment in which the devices are located.

In some implementations, data retrieved from the external device may be used to update a 3D model of the user (e.g., a point cloud model, a parametric representation model, a skeleton model (e.g., bone lengths, etc.)).

In some implementations, data retrieved from the external device may be used to update a predictive model (e.g., a neural network) used by the HMD to interpret its own sensor data. For example, data retrieved from the external device may be used as additional training data to update the predictive model or as input to the predictive model. In some implementations, data retrieved from the external device may be shared (e.g., directly or as gradients) to support federated learning.

In some implementations, a wearable electronic device has a processor (e.g., one or more processors) that executes instructions stored in a non-transitory computer-readable medium to perform a method. The method performs one or more steps or processes. In some implementations, the wearable electronic device receives, from a sensor of the wearable electronic device, first sensor data depicting a user of the wearable electronic device. Second sensor data depicting the user is received from a second device separate from the wearable electronic device. At least a part of the user depicted in the second sensor data is not depicted in the first sensor data. The method determines that a portion of the second sensor data depicts the user based on identifying a similarity between the first sensor data and second sensor data and a user model is updated based on the second sensor data.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of an exemplary method that provides sensor data from multiple devices to update a user model generated on a wearable device, in accordance with some implementations.

Figure 1:
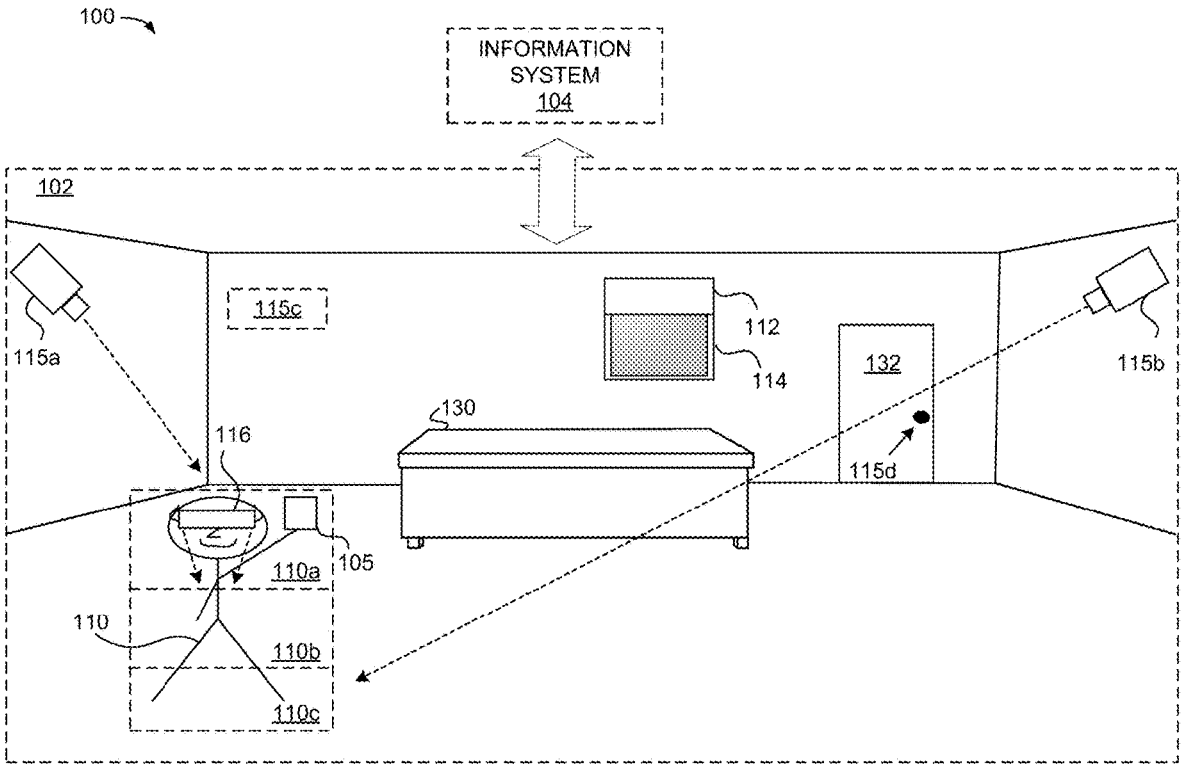
FIG. 1 illustrates an example operating environment associated with a process for generating and/or updating a user model representing a user, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of exemplary electronic devices 105, 112, 115a, 115b, 115c, 115d, and 116 (e.g., a wearable device) operating in a physical environment 102. Additionally, example environment 100 includes an information system 104 (e.g., a device control framework or network) in communication with one or more of the electronic devices 105, 112, 115a, 115b, 115c, 115d, and 116. In an exemplary implementation, electronic devices 105, 112, 115a, 115b, 115c, 115d, and 116 are communicating, e.g., while the electronic devices 105, 112, 115a, 115b, 115c, 115d, and 116 are sharing information with one another or an intermediary device such as a communication session server within the information system 104. Additionally, physical environment 102 includes a user 110 holding electronic device 105 and wearing electronic device 116. In some implementations, electronic device 116 comprises a wearable device (e.g., a head mounted display (HMD)) configured to present views of an extended reality (XR) environment, which may be based on the physical environment 102, and/or include added content such as virtual elements. In another example, multiple users may be present in a same physical environment as illustrated and described with respect to FIG. 3, infra.

In the example of FIG. 1, the physical environment 102 is a room that includes physical objects such as a desk 130, a window 114, and a door 132. In some implementations, each electronic device 105, 112, 115a, 115b, 115c, 115d, and 116 may include one or more cameras, microphones, depth sensors, motion sensors, optical sensors or other sensors that can be used to capture information about and evaluate the physical environment 102 and the objects within it, as well as information about user 110. Each electronic device 105, 112, 115a, 115b, 115c, 115d, and 116 may comprise a plurality of electronic devices.

The information about the physical environment 102 and/or user 110 may be used to generate and/or update a user (body) model (e.g., a representation of user 110). For example, a communication session may provide views of a 3D environment that is generated based on camera images and/or depth camera images (from an electronic device) of the physical environment 102 as well as a representation of user 110 based on camera images and/or depth camera images captured of user 110 based on a view of the user representation if consented by the user. One or more of the electronic devices 105, 112, 115a, 115b, 115c, 115d, and 116 may provide views of a 3D environment that includes representations of user 110. Additionally, one or more of the electronic devices 105, 112, 115a, 115b, 115c, 115d, and 116 may provide more than just views of a 3D environment. For example, each electronic device 105, 112, 115a, 115b, 115c, 115d, and 116 may be configured to generate its own user body model that may then be passed to an HMD for updating its associated user model. Alternatively, each electronic device 105, 112, 115a, 115b, 115c, 115d, and 116 may be configured to transmit intermediate data that may be easily consumed by HMD for updating its associated body model.

In the example of FIG. 1, electronic device 105 is illustrated as a hand-held device. Electronic device 105 may be a mobile phone, a tablet, a laptop, etc. In some implementations, electronic device 116 comprises a wearable device be worn by a user. For example, electronic device 116 may be a head-mounted device (HMD), a smart watch, a smart bracelet, a smart ring, a smart patch, an ear/head mounted speaker, etc.

In some implementations, electronic devices 115a and 115b each comprise a video retrieval device such as, inter alia, a camera (e.g., a security camera) capable of capturing a live motion image of (a portion of) user 110 or a still image of (a portion of) user 110.

In some implementations, electronic device(s) 115c may include device and sensor combinations capable of detecting audio signals/sounds within physical environment 102. In some implementations, electronic device(s) 115c may include device and sensor combinations capable of detecting lighting conditions within physical environment 102. In some implementations, electronic device(s) 115c may include device and sensor combinations capable of detecting a status of intelligent devices configured to automatically execute specified functions with respect to user commands and/or automated machine learning commands within physical environment 102. For example, electronic device(s) may include, inter alia, a smart TV, a motion capture system, a webcams, etc. In some implementations, electronic device(s) 115c may include device and sensor combinations capable of detecting a status of power being applied to any device within physical environment 102. In some implementations, electronic device(s) 115c may include device and sensor combinations capable of detecting motion of user 110 and/or any object within physical environment 102. In some implementations, electronic device(s) 115c may include device and sensor combinations capable of detecting a temperature occurring within any portion of physical environment 102. In some implementations, electronic device(s) 115c may include any type of device capable of detecting signals, conditions, statuses, etc. associated with physical environment 102. For example, In some implementations, electronic device 115d may include an intelligent lock device (e.g., a deadbolt lock) capable of automatically securing (e.g., locking) door 132 in response to user commands and/or automated machine learning commands within physical environment 102. In some implementations, electronic device 112 may include an intelligent motorized shade or blinds capable of automatically moving (e.g., in an upward or downward direction) to allow different lighting conditions (via window 114) within physical environment 102 in response to user commands and/or automated machine learning commands.

In some implementations, functions of the electronic devices 105, 112, 115a, 115b, 115c, 115d, and 116 are accomplished via two or more devices, for example a mobile device and base station or a head mounted device and an car mounted device. Various capabilities may be distributed amongst multiple devices, including, but not limited to power capabilities, CPU capabilities, GPU capabilities, storage capabilities, memory capabilities, visual content display capabilities, audio and/or video content production capabilities, etc. The multiple devices that may be used to accomplish the functions of electronic devices 105, 112, 115a, 115b, 115c, 115d, and 116 may communicate with one another via wired or wireless communications. In some implementations, each device communicates with a separate controller or server to manage and coordinate an experience for the user (e.g., a communication session server). Such a controller or server may be located in or may be remote relative to the physical environment 102.

In some implementations, a user model representing user 110 may be generated and/or updated based on sensor data captured via electronic device 116 (e.g., an HMD). For example, HMD may need to understand construction/biomechanics associated with user 110 such that the HMD may generate virtual representations of user 110. Additionally, the HMD may be configured to understand user gestures, etc. Generating or accessing an accurate user model may enable accurate and realistic representations of user 110, etc.

In some implementations, a user model representing user 110 may be generated based on sensor data associated with a first perspective view of a portion of user 110 captured via electronic device 116 (e.g., an HMD). The first perspective view may in some situations be a limited view of a body of the user where only a portion of the body visible from a downward perspective originating at the head position of the user is observed. Because the user model of the electronic device 116 may be based on this visible portion of user 110, an understanding of the unobserved portions body of the user may be less accurate than an understanding of the observed portions of the body of the user.

According to some implementations, the electronic device 116 can leverage sensor data from external devices to improve its user body model with respect to not only the unobserved portions of the body of the user, but also to the observed portions of the body of the user. For example, a user model representing user 110 may be updated/improved using sensor data (associated with differing perspective views of differing portions of user 110 not visible or detectable via electronic device 116) captured via any combination of electronic devices 105, 112, 115a, 115b, 115c, 115d. For example, HMD sensors (e.g., cameras of electronic device 116) may only provide an ability to capture a first single perspective view of a user (e.g., user 110 wearing the HMD) to supply sensor data for generating a body model representing the user. Likewise, an external device(s) (e.g., at least one of electronic devices 105, 112, 115a, 115b, 115c, 115d) may provide differing perspective views of sensor attributes associated with the user. Therefore, sensor data (associated with the differing perspective views of the user) retrieved via the external device(s) may be transmitted to the HMD such that a body model representing the user on the HMD may be accurately generated and/or updated/improved via usage of the sensor data from the HMD in combination with the sensor data from the external device (s).

In some implementations, sensor data captured by any of electronic devices 105, 112, 115a, 115b, 115c, 115d, and 116 may include visual data related to body portions of a user (e.g., a torso, back, leg portion, foot, etc.). In some implementations, sensor data provided by any of electronic devices 105, 112, 115a, 115b, 115c, 115d, and 116 may include information associated with features of the user such as, inter alia, body dimensions, body shape, skin texture, clothing texture/material, user pose, etc.

In some implementations, sensor data captured by electronic device(s) 115c may include data describing detected conditions within physical environment 102. Detected conditions within physical environment 102 may allow for condition modifications to enable an improved and accurate process for retrieving sensor data associated with body portions of user 110. For example, sensor data captured by electronic device(s) 115c may include data associated with lighting conditions within physical environment 102 which may affect an ability of devices 115a, 115b, and/or 116 to accurately capture visual sensor data of user 110. The lighting conditions may be determined to be too bright or too dark to accurately capture sensor data associated with body portions of user 110. In response to the lighting conditions, electronic device 112 (an intelligent motorized shade or blinds) may be activated to automatically move in an upward or downward direction to enable different lighting conditions (via window 114) within physical environment 102 to allow devices 115a, 115b, and/or 116 to accurately capture visual sensor data of user 110. Sensor data captured by electronic device(s) 115c may include data describing, inter alia, lighting conditions, a status of intelligent devices, power being applied to a device(s), motion of user 110 and/or objects within physical environment 102, a temperature within physical environment 102, an intelligent lock device (e.g., a deadbolt lock), etc.

In some implementations, electronic device 116 may capture sensor data (within an area 110b associated with a user portion(s) visible or detectable by sensors of electronic device 116) of portion(s) (e.g., arm, torso, and leg portion) of user 110. Likewise, electronic device 115a may capture sensor data (within an area 110a associated with a user portion(s) visible or detectable by sensors of electronic device 115a) of user portion(s) not visible or detectable by electronic device 116 (e.g., a head and neck portion) of user 110. Similarly, electronic device 115b may capture sensor data (within an area 110c associated with a user portion(s) visible or detectable by sensors of electronic device 115c) of portion(s) not visible or detectable by electronic devices 116 and 115a (e.g., lower leg and feet portions) of user 110. Sensor data captured by electronic devices 116, 115a, and 115b (and in some implementations additionally captured sensor data captured via electronic devices 105, 115b, 115c, and 115d) may be used in combination to generate and/or update a user model representing user 110. In some implementations, stored historical visual data (e.g., previously captured via an automated device such as a security camera in response to user authorization) may be used to supplement the sensor data captured by electronic devices 116, 115a, and 115b to generate and/or update the user model representing user 110. The user model may be stored or maintained by device 116. Alternatively, user model may be stored within a server (e.g., a cloud), divided amongst multiple devices, etc. Additionally, an external device (e.g., information system 104, device 105, device 115a, etc.) may maintain its own version of a body model, which may be sent to device 116 or uploaded into a server that may be accessed by device 116. Device 116 may then use that data/user model to update its own user model.

In some implementations, user 110 may be identified (to determine/identify sensor data (e.g., portions of an image) that represents user 110) prior to generating and/or updating a user model representing user 110. In some implementations, user 110 may be identified based on a determination that electronic devices 105, 112, 115a, 115b, 115c, 115d, and 116 are connected to a same network/framework. In some implementations, user 110 may be identified based on a determination that electronic devices 105, 112, 115a, 115b, 115c, 115d, and 116 are associated with a same user account. In some implementations, user 110 may be identified based on determining a similarity between sensor data retrieved from electronic devices 105, 112, 115a, 115b, 115c, 115d and sensor data retrieved from the electronic device 116 (e.g., an HMD) as further described with respect to FIG. 3.

In some implementations, sensor data retrieved from electronic devices 105, 112, 115a, 115b, 115c, 115d, and 116 may be used to generate and/or update a 3-dimensional (3D) model of user 110 (e.g., a point cloud model, a parametric representation model, a skeleton model (e.g., bone lengths, etc.), etc.).

In some implementations, sensor data retrieved from an external device (e.g., e.g., electronic devices 115a, 115b, etc.) may be used to update a predictive model (e.g., a neural network, etc.) used by an electronic device (e.g., an HMD such as electronic device 116) to interpret its own sensor data. For example, sensor data retrieved from an external device may be used as additional training data to update a predictive model or as input to the predictive model or input model.

In some implementations, sensor data retrieved from the external device may be shared (e.g., directly or as gradients) to support a federated learning process. A federated learning process may involve various techniques used to update a centrally-stored and distributed machine learning model based on use of the model on other devices to which the machine learning model is distributed. For example, a central device (e.g., information system 104) may distribute a machine learning model to multiple devices (e.g., HMDs) that each use the machine learning model to make predictions (e.g., inferences) using data obtained at those devices. Each of the multiple devices assesses the predictions made by the model using locally-known data (e.g., ground truth data) and determines updates to the model accordingly. The updates may be sent to the central device, where the model is updated, and the updated version of the model may be redistributed to the multiple devices. Federated learning techniques may rely on user input to supply the ground truth data that is used to assess the local predictions made on the user devices.

In some implementations, a user model (representing user 110) may be generated based on a combination of live images and sensor data of the user (e.g., images retrieved from electrical devices 105, 115a, 115b, 115c, and 116) and prior images of the user (e.g., stored images originally retrieved from e.g., a security camera) retrieved from information system 104. The prior images may be used to generate portions of the user model for which live image data is not available (e.g., portions of a user's body that are not in view of a camera or sensor of electrical devices 105, 115a, 115b, 115c, and 116 or that may be obscured, for example, by furniture as illustrated with respect to FIG. 2). In one example, electronic device 116 is an HMD and live image data of user's 110 face is retrieved via a downward facing camera that obtains images of the user's cheeks and mouth and inward facing camera images of the user's eyes, which may be combined with additional sensor data retrieved from additional electronic devices (e.g., electronic devices 105, 115a, 115b, 115c) and prior image data (from information system 104) of other portions of the users face, head, torso, and/or lower body that cannot be currently observed from the sensors of any of devices 105, 115a, 115b, 115c, and 116. Prior data regarding a user's appearance may be obtained at an earlier time during the communication session, during a prior use of any of devices 105, 115a, 115b, 115c, and 116, during an enrollment process used to obtain sensor data of the user's appearance from multiple perspectives and/or conditions, etc.

According to some implementations, the electronic devices (e.g., electronic devices 105, 115a, 115b, 115c, and 116) can generate and present an extended reality (XR) environment to one or more users during a communication session. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
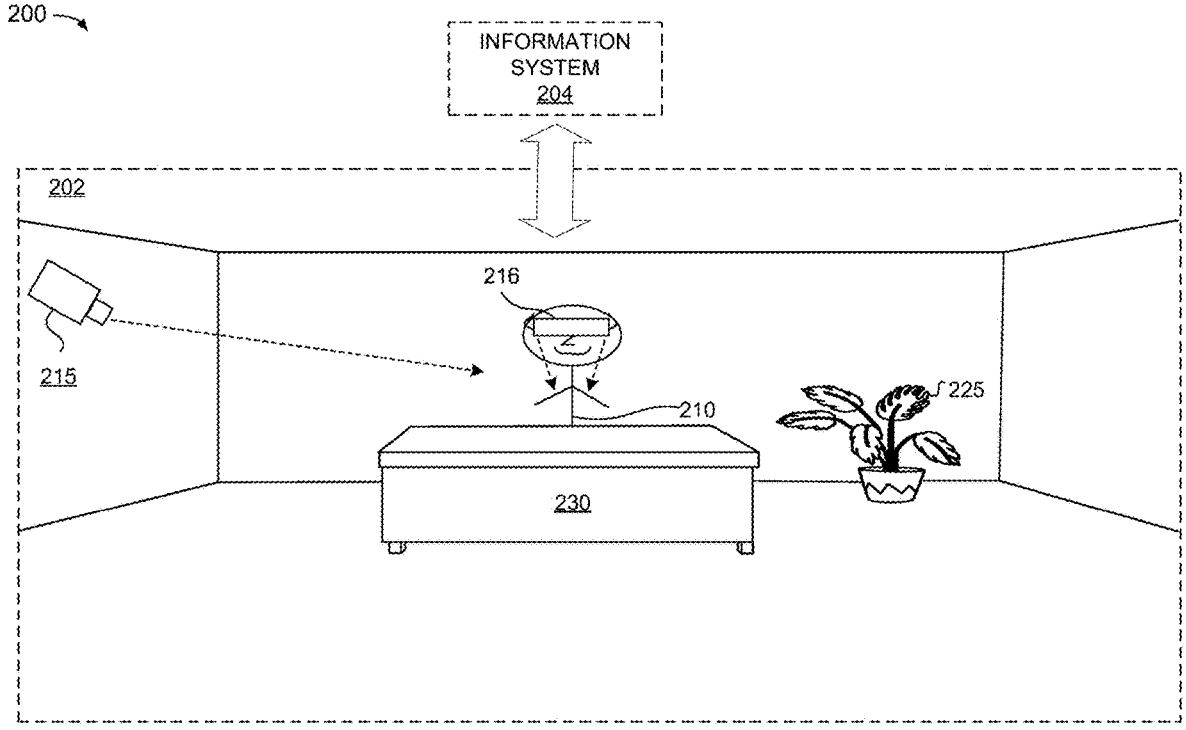
FIG. 2 illustrates an example operating environment associated with a process for generating and/or updating a user model representing a user comprising a body portion obscured from view, in accordance with some implementations.

FIG. 2 illustrates an example environment 200 comprising electronic devices 215 and 216 (e.g., a wearable device) operating in a physical environment 202. Physical environment 202 includes a user 210 wearing electronic device 216 (e.g., an HMD). Additionally, example environment 200 includes an information system 204 (e.g., a device control framework or network) in communication with one or more of the electronic devices 215 and 216. Physical environment 202 is a room that includes physical objects such as a desk 230 and a plant 225.

In the example of FIG. 2, a body portion of user 210 (e.g., a lower body portion) is obscured from view (e.g., a lower body portion of user 210 is not in view of a camera or sensor of electrical devices 215 and 216) by desk 230. Therefore, prior historical images (e.g., previously captured via an automated device such as a security camera in response to user authorization) of the obscured body portion of the user may be retrieved from a storage system such as a database of information system 204. The retrieved images (from the storage system) may be used to generate (body) portions representing the obscured body portion (for user model generation) that was not observed in image data captured during a live session. The generated body portions representing the obscured body portion (from the retrieved images) may be combined with sensor (image) data (associated with additional portions of user 210) captured by electrical devices 215 and 216 to generate and/or update a user model representing user 210. Alternatively, an obscured body portion may be retrieved from device 215 without any involvement from device 204. Generating and/or updating a user model representing user 210 may be performed in real time or off-line when a device is not being worn.

Figure 3:
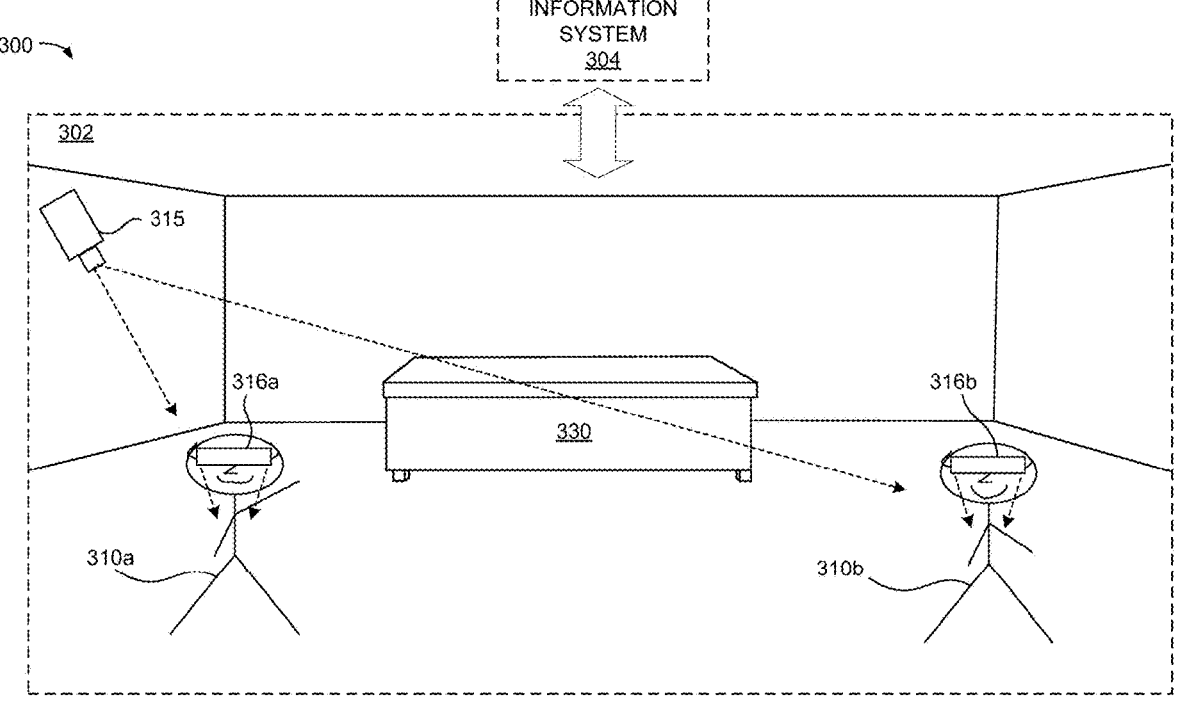
FIG. 3 illustrates an example process for identifying a user to determine sensor data that represents the user, in accordance with some implementations.

FIG. 3 illustrates an example environment 300 comprising electronic device 315a and electronic devices 316a and 316b (e.g., wearable devices) operating in a physical environment 302. Physical environment 302 includes a user 310a wearing electronic device 316a (e.g., an HMD) and a user 310b wearing electronic device 316b (e.g., an HMD). Additionally, example environment 300 includes an information system 304 (e.g., a device control framework or network) in communication with one or more of the electronic 315, 316a, and 316b. Physical environment 302 is a room that includes physical objects such as a desk 330.

In some implementations, electronic devices 315 and 316a may capture sensor data (associated with a user portion(s) visible or detectable by sensors of electronic devices 315 and 316a) of portion(s) of user 310a. Likewise, electronic devices 315 and 316b may capture sensor data (associated with a user portion(s) visible or detectable by sensors of electronic devices 315 and 316b) of portion(s) of user 310b. Sensor data captured by electronic devices 315 and 316a may be used in combination to generate and/or update a user model representing user 310a. Sensor data captured by electronic devices 315 and 316b may be used in combination to generate and/or update a user model representing user 310b. Therefore (in response to electronic device 315 being used to capture sensor data associated with body portions of users 310a and 310b), users 310a and 310b may require identification to determine sensor data that represents a correct one of users 310a or 310b prior to generating and/or updating a user model representing user 310a or 310b, respectively.

In an example implementation, a process for generating a model representing user 310a is initiated. During the process, sensor data associated with user 310a and user 310b is captured and it is determined user 310a and user 310b are each wearing similar clothing (e.g., a same style coat). Therefore, the process requires user 310a to be identified so that correct sensor data associated with user 310a is used to generate a model representing user 310a. The identification process may include determining a similarity between sensor data retrieved from electronic device 315 and sensor data captured from electronic device 316a. For example, sensor data from electronic device 315 may be compared to sensor data from electronic device 316 to determine a facial match associated with user 310a thereby identifying correct sensor data used for generating a model representing user 310a.

Figure 4:
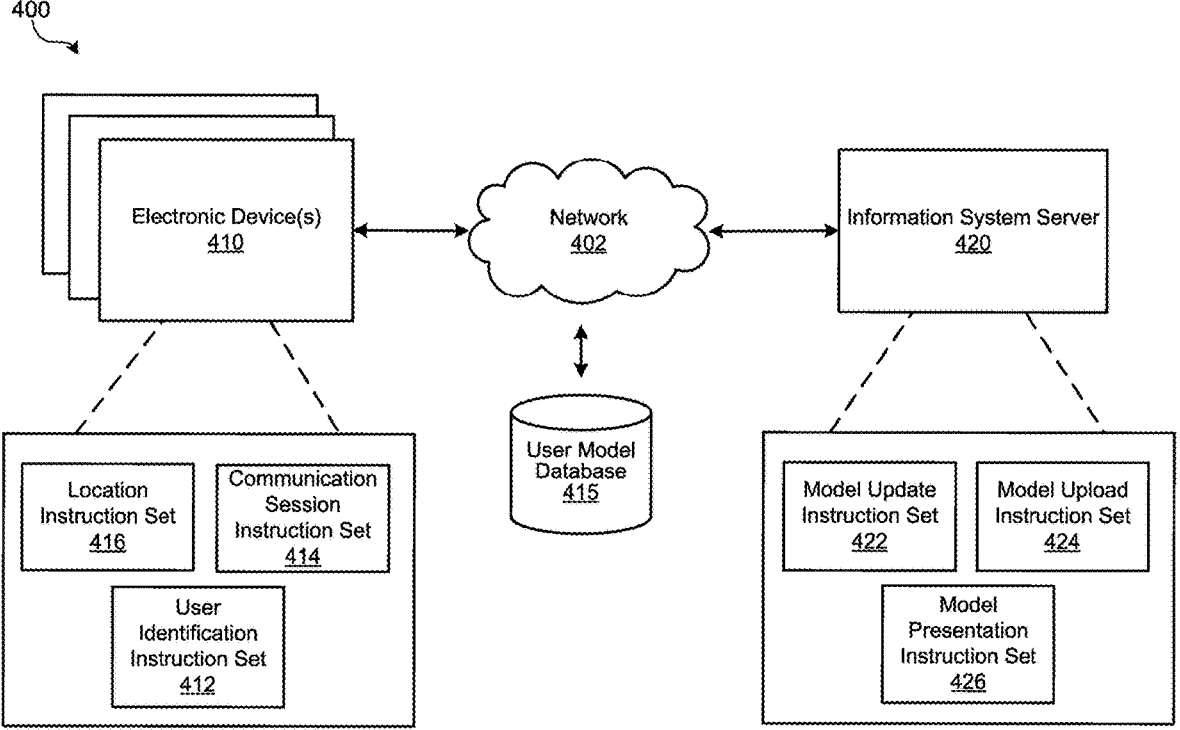
FIG. 4 illustrates a system flow diagram of an example environment in which a system can provide sensor data from multiple devices to update a user model generated on a wearable device, in accordance with some implementations.

FIG. 4 illustrates an example environment 400 for implementing a process for providing sensor data from multiple devices to update a user model generated on a wearable device, in accordance with some implementations. The example environment 400 includes one or more electronic devices 410 (e.g., electronic devices 105, 112, 115a, 115b, 115c, and 116 of FIG. 1, etc.), a user model database 415, and an information system server 420 (e.g., information system 104 of FIG. 1), that communicates over a data communication network 402, e.g., a local area network (LAN), a wide area network (WAN), the Internet, a mobile network, or a combination thereof.

One of electronic device(s) 410 (e.g., an electronic device used by a user, such as user device 105 used by user 110) may be a mobile phone, a tablet, a laptop, etc. In some implementations, one of electronic device(s) 410 may be worn by a user (e.g., electronic device 116 of FIG. 1). For example, electronic device(s) 410 may include a watch, a head-mounted device (HMD), head-worn device (glasses), headphones, an ear mounted device, etc. Any images of the example environment 400 may be displayed on the device that has a screen for displaying images and/or a screen for viewing stereoscopic images such as an HMD. In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

In some implementations, functions of electronic device(s) 410 are accomplished via two or more devices, for example a mobile device and base station or a head mounted device and an ear mounted device. Various capabilities may be distributed amongst multiple devices, including, but not limited to power capabilities, CPU capabilities, GPU capabilities, storage capabilities, memory capabilities, visual content display capabilities, audio content production capabilities, and the like. The multiple devices that may be used to accomplish the functions of electronic device(s) 410 may communicate with one another via wired or wireless communications over network 402. In some implementations, each device communicates with a separate controller or server to manage and coordinate an experience for the user (e.g., information system server 420 utilizing a communication session instruction set 414). Such a controller or server may be located in or may be remote relative to the physical environment of the electronic device(s) 410 (e.g., physical environment 102 of FIG. 1).

An example system flow of the example environment 400 includes electronic device(s) 410 acquiring sensor data such as light intensity image data (e.g., live camera feed such as RGB from light intensity cameras), depth image data (e.g., from a depth camera), motion trajectory data from motion sensor(s) data of a physical environment (e.g., the physical environment 102 of FIG. 1), acquiring positioning information (e.g., a visual inertial odometry (VIO) module determines VIO data based on the light intensity image data), assessing the depth data and motion data to determine localization data of electronic device(s) 410, and generates a (3D) user model (e.g., representing user 110 of FIG. 1) and a view (e.g., of physical environment 102 of FIG. 1) from the acquired sensor data (e.g., light intensity image data, depth data, and the like). In some implementations, other sources of physical environment information may be acquired (e.g., camera positioning information such as position and orientation data from position sensors) as opposed to using a VIO system.

For positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In some implementations, electronic device(s) 410 includes a location instruction set 416 that is configured with instructions executable by a processor to obtain sensor data (e.g., image data, RGB data, depth data, etc.) and track a location of a moving user (e.g., user 110) and device (e.g., electronic device 410, etc.) in a 3D coordinate system using one or more techniques. For example, the location instruction set 416 analyzes RGB images from a light intensity camera with a sparse depth map from a depth camera (e.g., time-of-flight sensor), plane extraction data (e.g., plane estimation parameters), and other sources of physical environment information (e.g., camera positioning information such as VIO data, or a camera's SLAM system, or the like)

to generate location data by tracking device location information for 3D reconstruction (e.g., a 3D model representing a user and one or more objects of physical environment 102 of FIG. 1).

In some implementations, electronic device(s) 410 is configured with instructions executable by a processor to obtain sensor data (e.g., image data, RGB data, depth data, etc.) and location data from the location instruction set 416 and generate 3D representation data (e.g., a user model in a physical environment) using one or more techniques. For example, electronic device(s) may analyze RGB images from a light intensity camera with a sparse depth map from a depth camera (e.g., time-of-flight sensor, passive or active stereo sensors such as a structured light depth camera, and the like), and other sources of physical environment information (e.g., camera positioning information such as VIO data, or a camera's SLAM system, or the like) to generate 3D representation data. For example, as illustrated in example environment 100 of FIG. 1, 3D representation data may include a representation of desk 130 and a representation of the user 110 (e.g., a user model, an avatar, etc.).

In some implementations, electronic device(s) 410 includes a user identification instruction set 412 that is configured with instructions executable by a processor to identify a user (e.g., user 110 of FIG. 1) associated with a user model being generated or updated via sensor data captured by multiple devices (e.g., an electronic device such as electronic devices 112, 115a-115d, 116, etc.). In some implementations, the user may be identified (to determine that all sensor data represents the user) prior to generating and/or updating a user model representing the user. In some implementations, the user may be identified based on a determination that multiple devices of electronic device(s) 410 are connected to a same network/framework. In some implementations, the user may be identified based on a determination that multiple devices of electronic device(s) 410 are associated with a same user account. In some implementations, the user may be identified based on determining a similarity between sensor data retrieved from multiple devices of electronic device(s) 410.

In some implementations, information system server 420 (e.g., a server within the information system 104) is an external server that is configured to facilitate user a model generation/update process between two or more of electronic device(s) 410. In some implementations, information system server 420 includes a model update instruction set 422 that is configured with instructions executable by a processor to update a user model representing a user based on sensor data (captured from multiple devices) associated with multiple differing perspective views and/or attributes of differing portions of a user. For example, sensors of a first device (e.g., cameras) may only provide an ability to capture a first single perspective view of a user and sensors of a second device(s) may provide differing perspective views of sensor attributes associated with the user. Therefore, combined sensor data (associated with the differing perspective views of the user) captured from multiple devices may be used to generate or update a user body model representing a user.

In some implementations, information system server 420 includes a model upload instruction set 422 that is configured with instructions executable by a processor to upload (to information system server 420) sensor data retrieved from electronic devices to be used as training data to update a predictive model or as input to a predictive model. In some implementations, upload instruction set 422 is configured to share sensor data (e.g., directly or as gradients) to support a federated learning process to update a centrally-stored and distributed machine learning model based on use of a resulting user model on multiple devices to which the machine learning model is distributed.

In some implementations, information system server 420 includes a model presentation instruction set 422 that is configured with instructions executable by a processor to present an updated user model to a user via an electronic device such as an HMD.

FIG. 5 is a flowchart representation of an exemplary method 500 that provides sensor data from multiple devices to update a user model generated on a wearable device, in accordance with some implementations. In some implementations, the method 500 is performed by a device, such as a mobile device, desktop, laptop, or server device. In some implementations, the device has a screen for displaying images and/or a screen for viewing stereoscopic images such as a head-mounted display (HMD such as e.g., device 116 of FIG. 5). In some implementations, the method 500 is performed by processing logic, including hardware, firmware, software, or a combination thereof. In some implementations, the method 500 is performed by a processor executing code stored in a non-transitory computer-readable medium (e.g., a memory). Each of the blocks in the method 500 may be enabled and executed in any order.

At block 502, the method 500 receives (from a sensor of a wearable electronic device) first sensor data depicting a user of the wearable electronic device.

At block 504, the method 500 receives (from a second device separate from the wearable electronic device) second sensor data depicting the user. In some implementations, at least a part of the user depicted in the second sensor data is not depicted in the first sensor data. In some implementations, the second sensor data includes current data depicting the user. In some implementations, the second sensor data includes historical data (e.g., retrieved from a security camera) depicting the user. In some implementations, the second sensor data includes information associated with body dimensions of the user, a shape of the user, a skin tone of the user, a texture and material of clothing of the user, pose information associated with the user, etc.

At block 506, the method 500 determines that a portion of the second sensor data depicts the user based on identifying a similarity between the first sensor data and second sensor data. In some implementations, the similarity between the first sensor data and second sensor data is identified based on detecting user attributes that may include cloths of the user, similar points within in images of the user, faces in the images of the user, body parts within in the images of the user, etc.

In some implementations, identifying the similarity between the first sensor data and second sensor data includes determining that the wearable electronic device is associated with the second device based on the wearable device and the second device being connected to the same network. In some implementations, identifying the similarity between the first sensor data and second sensor data includes determining that the wearable electronic device is associated with the second device based on the wearable device and the second device being associated with a same user account.

At block 508, the method 500 updates a user model based on the second sensor data. In some implementations the second sensor data may be used to update multiple user models. In some implementations, an updated user body model may be presented to the user via the wearable electronic device.

In some implementations, updating the user model may include generating a representation depicting a lower body portion of the user. In some implementations, the lower body portion of the user may include, inter alia, hips of the user, an upper leg of the user, a knee of the user, a lower leg of the user, an ankle of the user, a foot of the user, etc.

In some implementations, updating the user model includes updating a 3-dimensional (3D) model of the user based on the first sensor data and the second sensor data. A 3D model of the user may include a point cloud, a parametric representation, a skeleton representation, etc.

A 3D model of the user may be used to model e.g., bone lengths, body shape, body/skin texture (e.g., including tattoos, scars, etc.), clothing types, clothing shapes, clothing color, clothing material, clothing texture, hair style, hair color, facial hair features, eye color, accessories (e.g., an ear ring, nose piercing, necklace, glasses, headphones, purse, etc.). Multiple 3D models may be used for a single user to model different properties using different representations (e.g., a first model for body shape and a second (differing) model for body texture).

Model representations may include, inter alia, a parametric human body shape model, a voxel representation, an implicit surface representation, a neural radiance field (NeRF) representation, a skeleton representation, a point cloud, a triangle mesh, a bitmap (for texture), implicit texture, reference to a material catalog, reference to a texture atlas, reference to an asset catalog (e.g., for hair styles, clothes, accessories, etc.), etc.

In some implementations, updating the user model includes updating a predictive model executable by the wearable device to interpret data from the sensor of the wearable electronic device. In some implementations, the second sensor data may be used as additional training data to execute the process for updating the predictive model. In some implementations, the second sensor data may be used as input to the predictive model. In some implementations, the predictive model may be shared with a federated learning system. A predictive model may include any type of predictive model.

For example, a predictive model may include a human joint position predictive model (e.g., a neural network) that given one or more images of a user determines a 2D or 3D position of the user's joints. A generic version of a predictive model may have difficulties to reliably detect a barely visible ankle of the user's feet given that the model may be trained to support: users with a full view of their feet, users wearing socks of any color or texture, and users wearing shoes of any shape and color. Therefore, usage of sensor data from a different camera (e.g., the second sensor data from the second sensors), comprising an unobstructed view of the user's feet may be used to localize the ankles of the user based on retrieval of more context from the second sensors. In response, a portion of a model that is intended to localize the ankles of the user may be retrained (or refined) with sensor data that illustrates the users ankle with socks or shoes that the user is currently wearing. Therefore, a generic prediction model may be customized to a specified user and a visual appearance of their ankle thereby leading to more accurate detections of an actual ankle with respect to an ankle detection enabled by a generic model.

In some implementations (during time-variant object modeling), accurate synchronization of sensor data from an HMD and sensor data from a second external device may be preferred to establish a pair of sensor data from both sources (the HMD and second device) captured simultaneously. Synchronization may be achieved by matching timestamps from clock circuitry of respective devices (HMD and second device). Alternatively, synchronization may be achieved by analyzing sensor data and locating a timestamp (within a small time window) at which data from the second device appears maximally consistent with sensor data from the HMD (e.g., a posture of the user is maximally consistent). Synchronization of sensor data may enable the updating of predictive models, e.g., such that a human joint position prediction model may learn a position of a completely occluded ankle based on a view of the legs from the HMD's perspective. Information associated with an ankle location is retrieved from sensor data of the second device, having a line-of-sight to the ankle, but due to possible constant leg movements, sensor data from both devices (the HMD and second device) is captured simultaneously.

Figure 6:
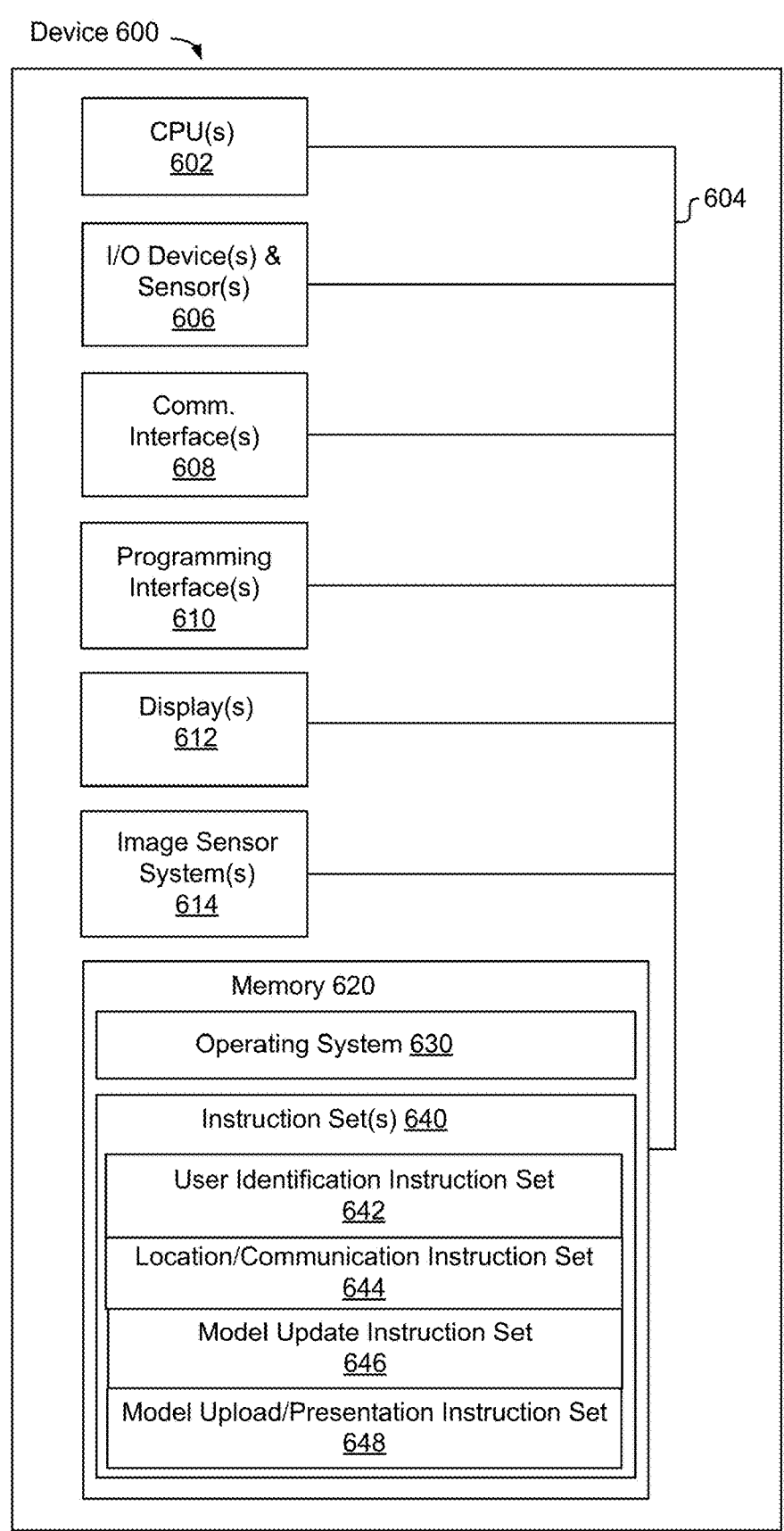
FIG. 6 is an example electronic device in accordance with some implementations.

FIG. 6 is a block diagram of an example device 600. Device 600 illustrates an exemplary device configuration for electronic devices 105, 112, 115a, 115b, 115c, 115d, and 116 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAS, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/ or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 are configured to present content (determined based on a determined user/ object location of the user within the physical environment) to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 102. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, the device 600 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 600 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 600.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 includes a user identification instruction set 642, a location/communication instruction set 644, a model update instruction set 646, and a model upload/presentation instruction set 648. The instruction set(s) 640 may be embodied as a single software executable or multiple software executables.

The user identification instruction set 642 is configured with instructions executable by a processor to identify a user associated with a user model being generated or updated via sensor data captured by multiple devices.

The location/communication instruction set 644 is configured with instructions executable by a processor to obtain sensor data and track a location of a moving user and associated device.

The model update instruction set 646 is configured with instructions executable by a processor to update a user model representing a user based on sensor data (captured from multiple devices) associated with multiple differing perspective views and/or attributes of differing portions of a user.

The model upload/presentation instruction set 648 is configured with instructions executable by a processor to upload sensor data retrieved from electronic devices to be used as training data to update a predictive model or as input to a predictive model. In some implementations, model upload/presentation instruction set 648 is configured with instructions executable by a processor to present an updated user model to a user via an electronic device such as an HMD.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a wearable electronic device having a processor and a display:
receiving, from a sensor of the wearable electronic device, first sensor data depicting a user of the wearable electronic device;
receiving, from a second device separate from the wearable electronic device, second sensor data depicting the user, wherein at least a part of the user depicted in the second sensor data is absent in the first sensor data;
determining that a portion of the second sensor data depicts the user based on comparing attributes associated with a first portion of the user detected in the first sensor data to attributes associated with a second portion of the user detected in the second sensor data to determine a similarity between the attributes associated with the first portion of the user detected in the first sensor data and the attributes associated with the second portion of the user detected in the second sensor data, the first portion of the user differing from the second portion of the user; and
updating a user model of the user based on the second sensor data.

2. The method of claim 1, wherein said updating the user model comprises generating a representation depicting a lower body portion of the user.

3. The method of claim 2, wherein the lower body portion of the user comprises a body portion selected from the group consisting of hips of the user, an upper leg of the user, a knee of the user, a lower leg of the user, an ankle of the user, and a foot of the user.

4. The method of claim 1, wherein the second sensor data comprises current data depicting the user.

5. The method of claim 1, wherein the second sensor data comprises historical data depicting the user.

6. The method of claim 1, wherein the similarity between the first sensor data and second sensor data is identified based on detecting user attributes selected from the group consisting of cloths of the user, similar points within in images of the user, faces in the images of the user, body parts within in the images of the user.

7. The method of claim 1, wherein said identifying the similarity between the first sensor data and second sensor data comprises determining that the wearable electronic device is associated with the second device based on the wearable electronic device and the second device being connected to a same network.

8. The method of claim 1, wherein said identifying the similarity between the first sensor data and second sensor data comprises determining that the wearable electronic device is associated with the second device based on the wearable device and the second device being associated with a same user account.

9. The method of claim 1, wherein the second sensor data comprises information selected from the group consisting of body dimensions of the user, a shape of the user, a skin tone of the user, a texture and material of clothing of the user, and pose information associated with the user.

10. The method of claim 1, wherein said updating the user model comprises updating a 3-dimensional (3D) model of the user based on the first sensor data and the second sensor data.

11. The method of claim 10, wherein the 3D model of the user comprises a model selected from the group consisting of a point cloud, a parametric representation, a skeleton representation.

12. The method of claim 1, wherein said updating the user model comprises updating a predictive model executable by the wearable device to interpret data from the sensor of the wearable electronic device.

13. The method of claim 12, further comprising using the second sensor data as additional training data to execute said updating the predictive model.

14. The method of claim 12, further comprising using the second sensor data as input to the predictive model.

15. The method of claim 12, further comprising sharing the predictive model with a federated learning system.

16. The method of claim 1, further comprising presenting, to the user via the wearable electronic device, the updated user body model.

17. A wearable electronic device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the electronic device to perform operations comprising:
receiving, from a sensor of the wearable electronic device, first sensor data depicting a user of the wearable electronic device;
receiving, from a second device separate from the wearable electronic device, second sensor data depicting the user, wherein at least a part of the user depicted in the second sensor data is absent in the first sensor data;
determining that a portion of the second sensor data depicts the user based on comparing attributes associated with a first portion of the user detected in the first sensor data to attributes associated with a second portion of the user detected in the second sensor data to determine a similarity between the attributes associated with the first portion of the user detected in the first sensor data and the attributes associated with the second portion of the user detected in the second sensor data, the first portion of the user differing from the second portion of the user; and
updating a user model of the user based on the second sensor data.

18. The wearable electronic device of claim 17, wherein said updating the user model comprises generating a representation depicting a lower body portion of the user.

19. The wearable electronic device of claim 18, wherein the lower body portion of the user comprises a body portion selected from the group consisting of hips of the user, an upper leg of the user, a knee of the user, a lower leg of the user, an ankle of the user, and a foot of the user.

20. The wearable electronic device of claim 17, wherein the second sensor data comprises current data depicting the user.

21. The wearable electronic device of claim 17, wherein the second sensor data comprises historical data depicting the user.

22. The wearable electronic device of claim 17, wherein the similarity between the first sensor data and second sensor data is identified based on detecting user attributes selected from the group consisting of cloths of the user, similar points within in images of the user, faces in the images of the user, body parts within in the images of the user.

23. The wearable electronic device of claim 17, wherein said identifying the similarity between the first sensor data and second sensor data comprises determining that the wearable electronic device is associated with the second device based on the wearable device and the second device being connected to the same network.

24. The wearable electronic device of claim 17, wherein said identifying the similarity between the first sensor data and second sensor data comprises determining that the wearable electronic device is associated with the second device based on the wearable device and the second device being associated with a same user account.

25. A non-transitory computer-readable storage medium, storing program instructions executable by one or more processors to perform operations comprising:

at a wearable electronic device having a processor and a display:

receiving, from a sensor of the wearable electronic device, first sensor data depicting a user of the wearable electronic device;

receiving, from a second device separate from the wearable electronic device, second sensor data depicting the user, wherein at least a part of the user depicted in the second sensor data is absent in the first sensor data;

determining that a portion of the second sensor data depicts the user based on comparing attributes associated with a first portion of the user detected in the first sensor data to attributes associated with a second portion of the user detected in the second sensor data to determine a similarity between the attributes associated with the first portion of the user detected in the first sensor data and the attributes associated with the second portion of the user detected in the second sensor data, the first portion of the user differing from the second portion of the user; and updating a user model of the user based on the second sensor data.

* * * * *